(12) United States Patent
Chen

(10) Patent No.: US 10,042,664 B2
(45) Date of Patent: Aug. 7, 2018

(54) DEVICE REMOTE ACCESS METHOD, THIN CLIENT, AND VIRTUAL MACHINE

(71) Applicant: Huawei Technologies Co., Ltd., Shenzhen (CN)

(72) Inventor: Zhen Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 102 days.

(21) Appl. No.: 15/056,400

(22) Filed: Feb. 29, 2016

(65) Prior Publication Data

US 2016/0179565 A1    Jun. 23, 2016

Related U.S. Application Data

(63) Continuation of application No. PCT/CN2014/083153, filed on Jul. 28, 2014.

(30) Foreign Application Priority Data

Nov. 14, 2013  (CN) .......................... 2013 1 0567832

(51) Int. Cl.
  *G06F 9/455* (2018.01)
  *H04L 29/08* (2006.01)
  *G06F 13/42* (2006.01)

(52) U.S. Cl.
  CPC ...... *G06F 9/45558* (2013.01); *G06F 13/4282* (2013.01); *H04L 67/08* (2013.01);
  (Continued)

(58) Field of Classification Search
  CPC ....... G06F 2009/45579; G06F 9/45558; G06F 2009/4557; G06F 13/4282
  See application file for complete search history.

(56) References Cited

U.S. PATENT DOCUMENTS 6,493,870 B1    12/2002  Madany et al.
2006/0107269 A1   3/2006  Bantz et al.
(Continued)

FOREIGN PATENT DOCUMENTS

CN        1233009 A    10/1999
CN      101827101 A     9/2010
(Continued)

OTHER PUBLICATIONS

"Implementing ActivIdentity Smart Cards for Use with HP Compaq t5720 Thin Clients and HP Blade PCs"; Hewlett-Packard Development Company, L.P.; 2007; accessed via internet URL <www.hp.com/ctg/Manual/c01153197.pdf>.*
(Continued)

*Primary Examiner* — Glenn A. Auve
(74) *Attorney, Agent, or Firm* — Conley Rose, P.C.

(57) ABSTRACT

A device remote access method includes receiving, by a bus filter driver on a thin client (TC) side, a request for remote access by a virtual machine (VM) side to a physical device on the TC side, converting, by the bus filter driver, the request for remote access into a remote operation instruction that may be read by a physical device driver, and sending, by the bus filter driver, the remote operation instruction to the physical device driver, where the remote operation instruction is used to instruct the physical device driver to drive the physical device to execute a read/write operation and return remote response data that carries an execution result of the read/write operation which implements remote access by the VM side to the physical device on the TC side, and because a device driver is not modified, the TC side may continue to normally access the physical device.

16 Claims, 7 Drawing Sheets

(52) U.S. Cl.
CPC ............... *G06F 2009/4557* (2013.01); *G06F 2009/45579* (2013.01)

(56) References Cited

U.S. PATENT DOCUMENTS

| | | | |
|---|---|---|---|
| 2006/0123129 A1* | 6/2006 | Toebes | H04L 67/2823 709/230 |
| 2006/0161415 A1* | 7/2006 | Takahashi | G06F 11/261 703/21 |
| 2007/0288623 A1* | 12/2007 | Kato | G06F 21/33 709/223 |
| 2010/0241772 A1* | 9/2010 | Kugimoto | G06F 9/4411 710/63 |
| 2011/0153835 A1 | 6/2011 | Rimac et al. | |
| 2011/0153853 A1 | 6/2011 | London et al. | |
| 2013/0139185 A1* | 5/2013 | Klissner | G06F 11/3636 719/328 |
| 2013/0326512 A1* | 12/2013 | Katz | H04L 65/4084 718/1 |
| 2014/0033234 A1* | 1/2014 | Wang | G06F 9/4413 719/327 |
| 2015/0237006 A1 | 8/2015 | Hu | |
| 2015/0249667 A1* | 9/2015 | Han | H04L 63/10 726/4 |
| 2016/0179565 A1 | 6/2016 | Chen | |

FOREIGN PATENT DOCUMENTS

| | | |
|---|---|---|
| CN | 103312744 A | 9/2013 |
| CN | 103370111 A | 10/2013 |
| CN | 103595790 A | 2/2014 |
| CN | 103595790 B | 1/2017 |
| EP | 1440374 A2 | 7/2004 |
| EP | 2230597 A1 | 9/2010 |
| EP | 2369479 A2 | 9/2011 |
| WO | 03036486 A2 | 5/2003 |
| WO | 2010104511 A1 | 9/2010 |

OTHER PUBLICATIONS

Klein, Helge; "Getting USB Smart Card Readers to Work With Citrix XenDesktop"; Apr. 10, 2013; accessed via internet URL <helgeklein.com/blog/2013/04/getting-smart-card-readers-to-work-with-citrix-xendesktop>.*
Partial English Translation and Abstract of Chinese Patent Application No. CN103595790, dated Mar. 10, 2016, 4 pages.
Foreign Communication From a Counterpart Application, PCT Application No. PCT/CN2014/083153, English Translation of International Search Report dated Nov. 2, 2014, 2 pages.
Foreign Communication From a Counterpart Application, PCT Application No. PCT/CN2014/083153, English Translation of Written Opinion dated Nov. 2, 2014, 6 pages.
Morton, R., et al., "Accessing USB devices in a Hyper-V virtual machine," Retrieved from the Internet: URL:https://blogs.technet.microsoft.com/canitpro/2012/09/06/accessing-usb-devices-in-a-hyper-v-virtual-machine/ [retrieved on Aug. 17, 2016], Sep. 6, 2012, 4 pages.
Foreign Communication From a Counterpart Application, European Application No. 14861685.7, Extended European Search Report dated Aug. 24, 2016, 10 pages.
Foreign Communication From a Counterpart Application, Chinese Application No. 201310567832.7, Chinese Office Action dated Mar. 3, 2016, 5 pages.
Foreign Communication From a Counterpart Application, European Application No. 14861685.7, European Office Action dated Nov. 15, 2017, 8 pages.
Foreign Communication From a Counterpart Application, European Application No. 14861685.7, European Office Action dated May 3, 2017, 9 pages.

* cited by examiner

DEVICE REMOTE ACCESS METHOD, THIN CLIENT, AND VIRTUAL MACHINE

CROSS-REFERENCE TO RELATED APPLICATIONS

This application is a continuation of International Application No. PCT/CN2014/083153, filed on Jul. 28, 2014, which claims priority to Chinese Patent Application No. 201310567832.7, filed on Nov. 14, 2013, both of which are hereby incorporated by reference in their entireties.

TECHNICAL FIELD

The present disclosure relates to the field of communications technologies, and in particular, to a device remote access method, a thin client, and a virtual machine.

BACKGROUND

In an application scenario of a desktop cloud system, a user can implement, on a virtual machine (VM) of a remote data center using a network, remote access to a physical device connected to a local thin client (TC), for example, a physical device such as a smart card that is connected to the TC side using a universal serial bus (USB) interface.

Generally, the VM side can implement the foregoing remote access using a redirection technology, that is, a device driver in a physical device driver on the TC side is modified to a redirection driver to enable the redirection driver to read a remote operation instruction that carries a request for accessing a physical device on the TC side by the VM side such that the VM side can implement remote access to the physical device.

However, because the modified redirection driver cannot read an operation instruction on the TC side, the TC side cannot continue to normally access the physical device.

SUMMARY

Technical Problem

In view of this, a technical problem to be solved in the present disclosure is how to implement, in a case in which a device driver on a TC side is not modified, remote access by a VM side to a physical device on the TC side.

Solutions

To solve the foregoing problem, according to a first aspect, the present disclosure provides a device remote access method, where the method is applied in a desktop cloud system and includes receiving, by a bus filter driver on a TC side, a request for remote access by a VM side to a physical device on the TC side, converting, by the bus filter driver, the request for remote access into a remote operation instruction that can be read by a physical device driver, and sending, by the bus filter driver, the remote operation instruction to the physical device driver, where the remote operation instruction is used to instruct the physical device driver to drive the physical device to execute a read/write operation and return remote response data that carries an execution result of the read/write operation.

With reference to the first aspect, in a first possible implementation manner, after the sending, by the bus filter driver, the remote operation instruction to the physical device driver, the method further includes receiving, by the bus filter driver, the remote response data that is returned by the physical device using the physical device driver, and sending, by the bus filter driver, the remote response data to the VM side.

With reference to the first aspect or the foregoing possible implementation manner, in a second possible implementation manner, the physical device is a smart card that is connected to the TC side using a USB.

With reference to the second possible implementation manner of the first aspect, in a third possible implementation manner, the bus filter driver is a USB filter driver, the request for remote access is a remote USB request message, the remote operation instruction and a local operation instruction are local USB request messages, and the remote response data and local response data are local USB answer messages.

To solve the foregoing problem, according to a second aspect, the present disclosure provides a device remote access method, where the method is applied in a desktop cloud system and includes: receiving, by a virtual bus driver on a VM side, a virtual operation instruction from an application program on the VM side to a virtual device driver on the VM side, converting, by the virtual bus driver, the virtual operation instruction into a request for remote access that can be read by a bus filter driver on a TC side, and sending, by the virtual bus driver, the request for remote access to the TC side, where the request for remote access is used to instruct the bus filter driver to convert the request for remote access into a remote operation instruction that can be read by a physical device driver on the TC side, and the remote operation instruction is used to instruct the physical device driver to drive a physical device to execute a read/write operation and return remote response data that carries an execution result of the read/write operation.

With reference to the second aspect, in a first possible implementation manner, after the sending, by the virtual bus driver, the request for remote access to the TC side, the method includes receiving, by the virtual bus driver, the remote response data sent by the TC side, and sending, by the virtual bus driver, the remote response data to the application program using the virtual device driver.

With reference to the second aspect or the foregoing possible implementation manner, in a second possible implementation manner, the physical device is a smart card that is connected to the TC side using a USB.

With reference to the second possible implementation manner of the second aspect, in a third possible implementation manner, the virtual bus driver is a virtual USB driver, the request for remote access is a remote USB request message, the virtual operation instruction is a local USB request message, and the remote response data is a local USB answer message.

To solve the foregoing problem, according to a third aspect, the present disclosure provides a TC side, where the TC side includes a bus filter driver and a physical device driver, where the bus filter driver is configured to receive a request for remote access by a VM side to a physical device on the TC side, convert the request for remote access into a remote operation instruction that can be read by the physical device driver; and send the remote operation instruction to the physical device driver, where the remote operation instruction is used to instruct the physical device driver to drive the physical device to execute a read/write operation and return remote response data that carries an execution result of the read/write operation.

With reference to the third aspect, in a first possible implementation manner, the physical device driver is further configured to receive the remote response data of the physical device and forward the remote response data to the bus filter driver, and the bus filter driver is further configured to receive the remote response data of the physical device driver and forward the remote response data to the VM side.

With reference to the third aspect or the foregoing possible implementation manner, in a second possible implementation manner, the physical device is a smart card that is connected to the TC side using a USB.

With reference to the second possible implementation manner of the third aspect, in a third possible implementation manner, the bus filter driver is a USB filter driver, the request for remote access is a remote USB request message, the remote operation instruction and a local operation instruction are local USB request messages, and the remote response data and local response data are local USB answer messages.

To solve the foregoing problem, according to a fourth aspect, the present disclosure provides a VM side, where the VM side includes a virtual bus driver and a virtual device driver, where the virtual bus driver is configured to receive a virtual operation instruction from an application program on the VM side to the virtual device driver on the VM side, convert the virtual operation instruction into a request for remote access that can be read by a bus filter driver on a TC side, and send the request for remote access to the TC side, where the request for remote access is used to instruct the bus filter driver to convert the request for remote access into a remote operation instruction that can be read by a physical device driver on the TC side, and the remote operation instruction is used to instruct the physical device driver to drive a physical device to execute a read/write operation and return remote response data that carries an execution result of the read/write operation.

With reference to the fourth aspect or the foregoing possible implementation manner, in a second possible implementation manner, the virtual bus driver is further configured to receive the remote response data of the VM side and forward the remote response data to the virtual device driver, and the virtual device driver is further configured to receive the remote response data of the virtual bus driver and forward the remote response data to the application program.

With reference to the fourth aspect or the foregoing possible implementation manner, in a third possible implementation manner, the physical device is a smart card that is connected to the TC side using a USB.

With reference to the third possible implementation manner of the fourth aspect, in a fourth possible implementation manner, the virtual bus driver is a virtual USB driver, the request for remote access is a remote USB request message, the virtual operation instruction is a local USB request message, and the remote response data is a local USB answer message.

Beneficial Effects

A request for remote access by a VM side to a physical device on a TC side is received using a bus filter driver on the TC side, and the request for remote access is converted into an operation instruction that can be read by a physical device driver on the TC side. According to the device remote access method, the thin client, and the virtual machine in the embodiments of the present disclosure, remote access by the VM side to the physical device on the TC side can be implemented, and because a device driver is not modified, the TC side can continue to normally access the physical device.

Exemplary embodiments are described in detail with reference to the following accompanying drawings to make other features and aspects of the present disclosure clearer.

BRIEF DESCRIPTION OF DRAWINGS

Accompanying drawings included in the specification and constituting a part of the specification and the specification together illustrate exemplary embodiments, features, and aspects of the present disclosure, and are used for explaining principles of the present disclosure.

DESCRIPTION OF EMBODIMENTS

Figure 1:
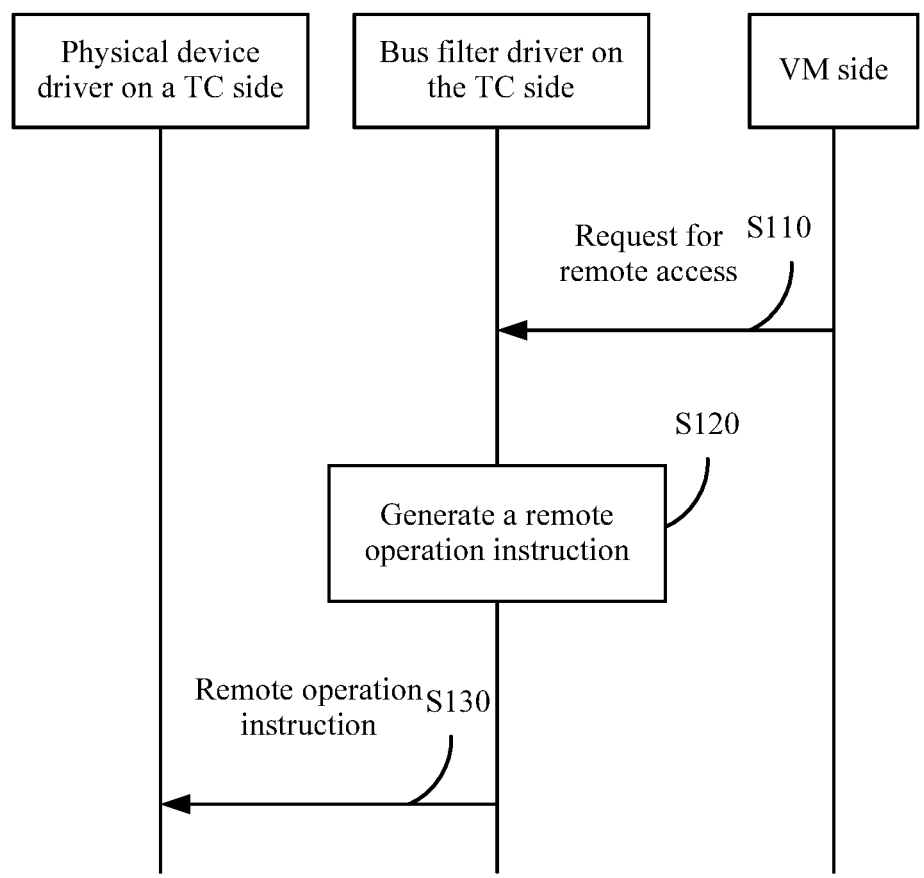
FIG. 1 is a flowchart of a device remote access method according to Embodiment 1 of the present disclosure.

Various exemplary embodiments, features, and aspects of the present disclosure are described in detail in the following with reference to the accompanying drawings. In the accompanying drawings, a same reference numeral indicates elements that have a same or similar function. Although various aspects of the embodiments are shown in the accompanying drawings, unless otherwise specified, the accompanying drawings are not necessarily drawn to scale.

The special term "exemplary" herein refers to "can be used as an example, an embodiment, or an illustration". Any embodiment described as "exemplary" herein is not necessarily to be interpreted as optimal or better than another embodiment.

In addition, to better describe the present disclosure, many details are given in the following specific implementation manners. A person skilled in the art should understand that the present disclosure can still be implemented even without some specific details. In some embodiments, a method, a means, an element, and a circuit that are known to a person skilled in the art are not further described in order to highlight the subject of the present disclosure.

Embodiment 1

FIG. 1 is a flowchart of a device remote access method according to an embodiment of the present disclosure. As shown in FIG. 1, the device remote access method mainly includes the following steps.

Step S110: A bus filter driver on a TC side receives a request for remote access by a VM side to a physical device on the TC side.

Furthermore, in a desktop cloud application scenario, a local TC side and a remote VM side are connected using a network. The TC side is connected to one or more physical devices. The TC side is configured with the bus filter driver. If an application program on the VM side needs to access a physical device connected to the TC side, the TC side may receive, from the VM side, a request for remote access to the physical device on the TC side. The request for remote access carries information indicating that the application program on the VM side requests to access the physical device on the TC side. The physical device may be connected to the TC side using various bus interfaces, for example, a USB interface. According to a type of the physical device, a type of the bus filter driver may be correspondingly set. For example, if a smart card is connected to the TC side using a USB interface, the bus filter driver is a USB bus filter driver. The physical device may be a smart card or another device.

In addition, the request for remote access may further carry identification information of the physical device, and the TC side may determine, according to the identification information, a specific physical device that the VM side needs to access, and/or the request for remote access may carry identification information of the VM side, and the TC side may determine, according to the identification information, which specific VM side the request for remote access is from and/or which specific application program on a VM side the request for remote access is from.

Step S120: The bus filter driver converts the request for remote access into a remote operation instruction that can be read by a physical device driver.

Furthermore, the bus filter driver on the TC side first determines whether a received instruction is the request for remote access of the VM side. The bus filter driver processes only the received request for remote access of the VM side, but does not process another instruction. If the received instruction is the request for remote access of the VM side, the bus filter driver generates, according to the request for remote access, a remote operation instruction for a corresponding physical device driver on the TC side, that is, converts the request for remote access into a remote operation instruction that can be read by the corresponding physical device driver on the TC side.

Step S130: The bus filter driver sends the remote operation instruction to the physical device driver, where the remote operation instruction is used to instruct the physical device driver to drive the physical device to execute a read/write operation and return remote response data that carries an execution result of the read/write operation.

For example, the bus filter driver sends the remote operation instruction to the physical device driver. The physical device driver generates, according to the remote operation instruction, a remote drive instruction that can be read by the physical device, and sends the remote drive instruction to the physical device. The physical device executes a corresponding read/write operation according to the remote drive instruction, generates remote response data according to an execution result of the read/write operation, and returns the remote response data to the physical device driver. The read/write operation executed by the physical device may include reading existing data in the physical device, for example, user identity information used to perform authentication on the VM side, or writing data into the physical device. The remote response data may include the identification information of the VM side, and the TC side may determine, according to the identification information, which specific VM side the remote response data is to be sent to, and the remote response data may further carry identification information of the TC side, and the VM side may determine, according to the identification information, which specific TC side the response data is from.

In addition, because a device driver is not modified, the physical device driver can still respond to a request for local access sent by an application program on the TC side, thereby ensuring that the application program on the TC side can continue to access the physical device without being affected by the request for remote access of the VM side.

In a possible implementation manner, the physical device driver may receive a local operation instruction from the application program on the TC side to the physical device, and the physical device driver drives, according to the local operation instruction, the physical device to execute a read/write operation and return local response data that carries an execution result of the read/write operation.

If the physical device driver receives the local operation instruction sent by the application program on the local TC side, the physical device driver generates, according to the local operation instruction, a local drive instruction that can be read by the physical device, and sends the local drive instruction to the physical device. The physical device executes a corresponding read/write operation according to the local drive instruction, for example, reading existing data in the physical device (for example, user identity information used to perform authentication on the VM side), or writing data into the physical device. The physical device generates local response data according to an execution result of the read/write operation, and returns the local response data to the physical device driver. The physical device driver forwards, based on this, the local response data to the application program on the TC side.

For example, a user may request, on the TC side, to remotely log in to a remote data center, that is, a desktop cloud system on the VM side. The desktop cloud system reads data in the smart card that is connected to the TC side, and performs an authentication operation, and after the authentication succeeds, the user can remotely log in, on the TC side, to the VM side. If the user further needs to log in to the application program on the local TC side, the user may continue to read the data in the smart card on the local TC side, and perform an authentication operation on the application program on the local TC side.

It should be noted that the physical device driver sequentially processes the local operation instruction and the remote operation instruction according to a sequence in which each instruction arrives at the physical device driver in order to sequentially respond to the request for local access of the TC side and the request for remote access of the VM side.

In this way, a bus filter driver on a TC side receives a request for remote access by a VM side to a physical device on the TC side, and converts the request for remote access into an operation instruction that can be read by a physical device driver on the TC side such that remote access by the VM side to the physical device on the TC side can be implemented, and because a device driver is not modified, the TC side can continue to normally access the physical device.

In addition, because the bus filter driver does not need to make any modification to a local existing USB instruction, compared with a USB redirection method in the prior art, the method in this embodiment is applicable to various existing application programs and various existing physical devices on the TC side, and a remote access speed of the physical device is not affected. Because a personal computer/smart card (PC/SC) protocol is not used, compared with a PC/SC protocol redirection method in the prior art, according to the method in this embodiment, the physical device does not need to support the PS/SC protocol. Therefore, the method in this embodiment has good compatibility.

Embodiment 2

Figure 2:
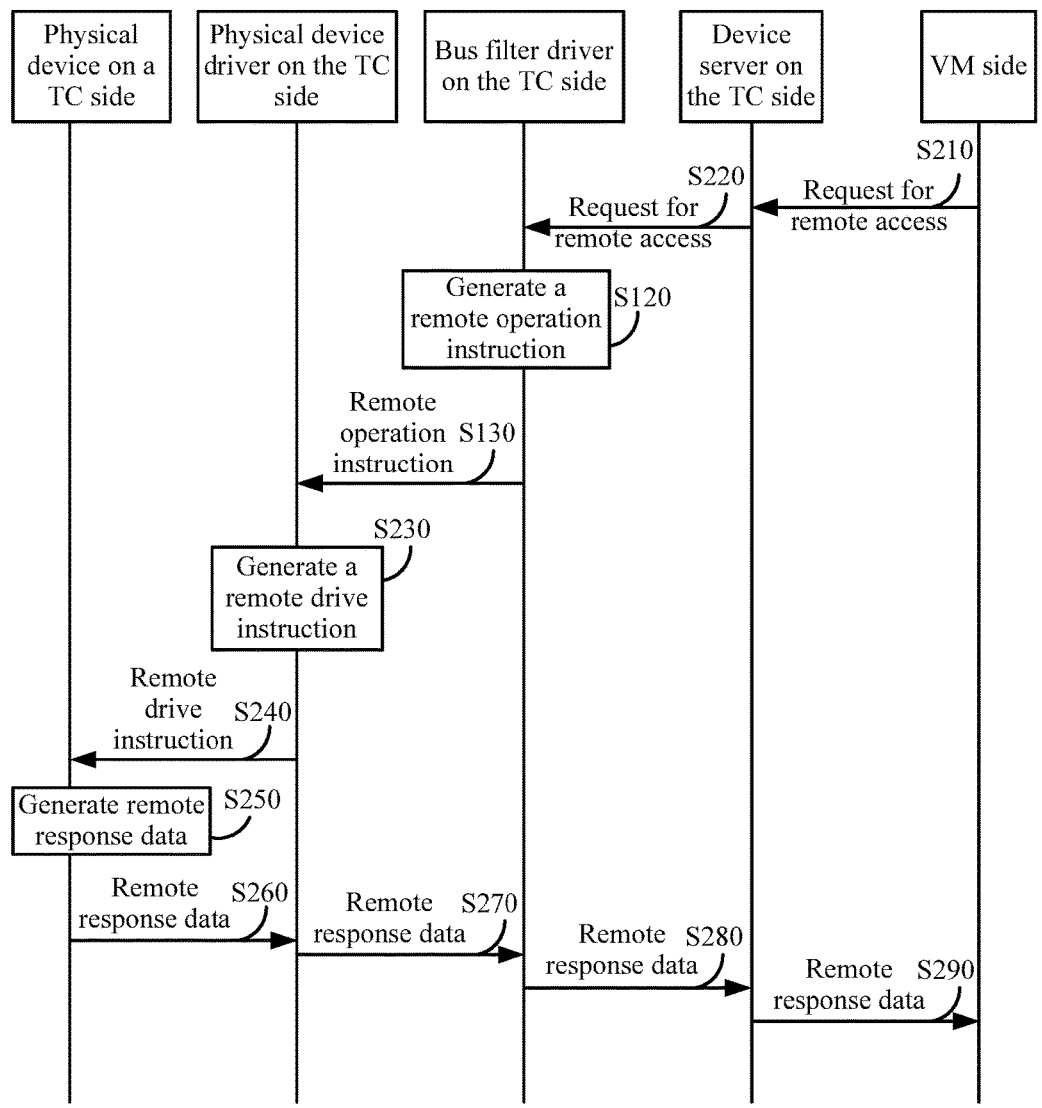
FIG. 2 is a flowchart of a device remote access method according to Embodiment 2 of the present disclosure.

FIG. 2 is a flowchart of a device remote access method according to Embodiment 2 of the present disclosure. Components in FIG. 2 that have same reference numerals as those in FIG. 1 have same functions. For brevity, a detailed description of these components is omitted.

As shown in FIG. 2, a major difference between the method shown in FIG. 2 and the method shown in FIG. 1 lies in that, after step S130, a bus filter driver may further receive remote response data that is returned by a physical device using a physical device driver, and send the remote response data to a VM side.

In a possible implementation manner, step S110 may further include the following steps.

Step S210: A device server on a TC side receives a request for remote access to the physical device that is sent by the VM side.

Step S220: The bus filter driver receives the request for remote access to the physical device that is sent by the device server on the TC side.

The TC side is configured with the device server. The device server may receive, using a network, data that is sent, based on a network transmission protocol between the TC side and the VM side, by the VM side, for example, a request for remote access by the VM side to the physical device on the TC side, and the device server forwards the request for remote access to the bus filter driver such that the bus filter driver processes the request for remote access. The device server on the TC side may further parse, based on the network transmission protocol between the TC side and the VM side, the received data to obtain the request for remote access, and then send the request for remote access to the bus filter driver.

For example, if the physical device driver receives a remote operation instruction sent by the bus filter driver, a process of generating, according to the remote operation instruction, remote response data may further include the following steps.

Step S230: The physical device driver generates, according to the received remote operation instruction of the bus filter driver, a remote drive instruction that can be read by the physical device.

Step S240: The physical device driver sends the remote drive instruction to the physical device.

Step S250: The physical device executes a corresponding read/write operation according to the received remote drive instruction, and generates remote response data according to an execution result of the read/write operation.

Step S260: The physical device sends the remote response data to the physical device driver.

In a possible implementation manner, after step S130, the method may further include the following steps.

Step S270: The physical device driver forwards the received remote response data to the bus filter driver.

Step S280: The bus filter driver forwards the received remote response data to the device server on the TC side.

Step S290: The device server forwards the received remote response data to the VM side.

The device server may receive data sent by the bus filter driver, for example, the remote response data of the physical device on the TC side, and the device server may forward, using a network connected between the TC side and the VM side, the remote response data to the VM side such that the VM side processes the remote response data. To satisfy a requirement for network transmission, the device server on the TC side may further convert the remote response data into data that supports network transmission protocols between the TC side and the VM side, and then send the data to the VM side.

In a possible implementation manner, the physical device is a smart card that is connected to the TC side using a USB.

In a possible implementation manner, the bus filter driver is a USB filter driver, the request for remote access is a remote USB request message, the remote operation instruction and a local operation instruction are local USB request messages, and the remote response data and local response data are local USB answer messages.

For example, if the physical device is a smart card that is connected to the TC side using a USB interface, the TC side is correspondingly configured with a USB bus filter driver. The USB bus filter driver may receive a remote USB request message (USB Request Block, (URB)) of the VM side, where the remote USB request message carries information about the request for remote access to the smart card, and a local URB is generated according to the information, and the local URB is sent to a smart card driver, where the local URB carries information about the remote operation instruction for the smart card. An application program on the local TC side may send the local URB to the smart card driver. The smart card executes a corresponding read/write operation, generates a local USB answer message, and returns the local USB answer message to the smart card driver, where the local USB answer message carries information about the remote response data or information about the local response data. According to content of the local USB answer message, the smart card driver returns the remote response data to the USB filter driver, or returns the local response data to the application program on the local TC side.

In addition, the device server on the TC side may further detect whether a user inserts a physical device into the TC side. If it is detected that the physical device is inserted into the TC side, the device server on the TC side sends, to the VM side, an insertion notification corresponding to the physical device such that the VM side loads, according to the insertion notification, a virtual device corresponding to the physical device. The device server on the TC side may further receive a request for querying the physical device that is sent by the VM side, or actively query device information, and send the device information to the VM side according to the queried device information of the physical device such that the VM side loads the virtual device corresponding to the physical device. The device information may include device information such as a device type and a device identifier of the physical device. In addition, the device server on the TC side may further detect whether a physical device is removed from the TC side. If it is detected that the physical device is removed from the TC side, the device server on the TC side sends, to the VM side, a removal notification corresponding to the physical device such that the VM side unloads a virtual device corresponding to the physical device. In this way, synchronous loading and synchronous unloading of the virtual device on the VM side and the physical device on the TC side are implemented.

The removal notification may carry the device information of the physical device such that the VM side determines a specific virtual device that needs to be unloaded.

Embodiment 3

Figure 3:
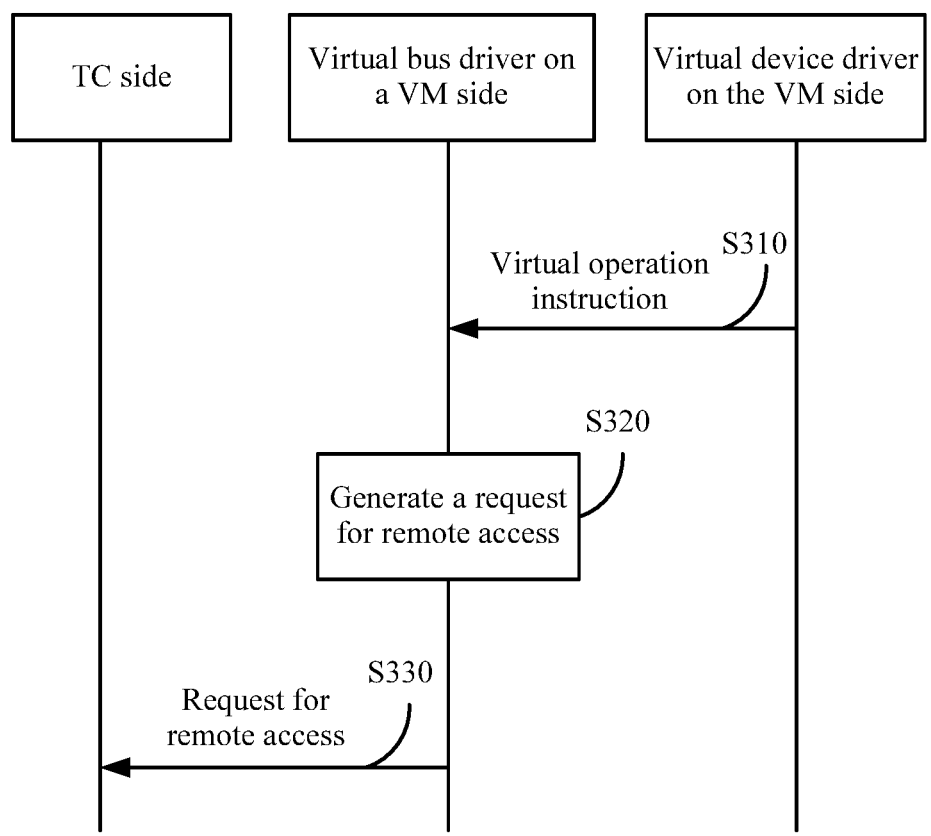
FIG. 3 is a flowchart of a device remote access method according to Embodiment 3 of the present disclosure.

FIG. 3 is a flowchart of a device remote access method according to Embodiment 3 of the present disclosure. As shown in FIG. 3, the device remote access method mainly includes the following steps.

Step S310: A virtual bus driver on a VM side receives a virtual operation instruction from an application program on the VM side to a virtual device driver on the VM side.

The VM side is configured with the virtual bus driver and the virtual device driver. The VM side loads, according to a requirement for remote access to a physical device on a TC side, by disposing the virtual bus driver and the virtual device driver on the VM side, a virtual device that is corresponding to the physical device on the TC side. If the application program on the VM side needs to access the physical device on the TC side, the virtual bus driver on the VM side may receive the virtual operation instruction from the application program on the VM side to the virtual device driver on the VM side. The physical device may be connected to the TC side using various bus interfaces, for example, a USB interface. According to a type of the physical device, a type of the virtual bus driver on the VM side may be correspondingly set. For example, if a smart card is connected to the TC side using the USB interface, the virtual bus driver on the VM side may be set as a virtual USB bus driver. In addition, the physical device may be a smart card or another device.

Step S320: The virtual bus driver converts the virtual operation instruction into a request for remote access that can be read by a bus filter driver on the TC side.

Furthermore, the virtual bus driver generates, according to the virtual operation instruction, a request for remote access to a corresponding physical device on the TC side, that is, converts the virtual operation instruction into a request for remote access that can be read by a corresponding bus filter driver on the TC side. The request for remote access carries information indicating that the application program on the VM side requests to access the corresponding physical device on the TC side, and the request for remote access may further carry identification information of the physical device such that the TC side may determine, according to the identification information, a specific physical device that the VM side needs to access; and/or the request for remote access may carry identification information of the VM side such that the TC side may determine, according to the identification information, which specific VM side the request for remote access is from and/or which specific application program of a VM side the request for remote access is from.

Step S330: The virtual bus driver sends the request for remote access to the TC side.

Further, the request for remote access is used to instruct the bus filter driver to convert the request for remote access into a remote operation instruction that can be read by a physical device driver on the TC side. The remote operation instruction is used to instruct the physical device driver to drive the corresponding physical device to execute a read/write operation and return remote response data that carries an execution result of the read/write operation.

In this way, a virtual bus driver on a VM side receives a virtual operation instruction from an application program on the VM side to a physical device on a TC side, and converts the virtual operation instruction into a request for remote access that can be read by a bus filter driver on the TC side such that remote access by the application program on the VM side to the physical device on the TC side can be implemented.

Embodiment 4

Figure 4:
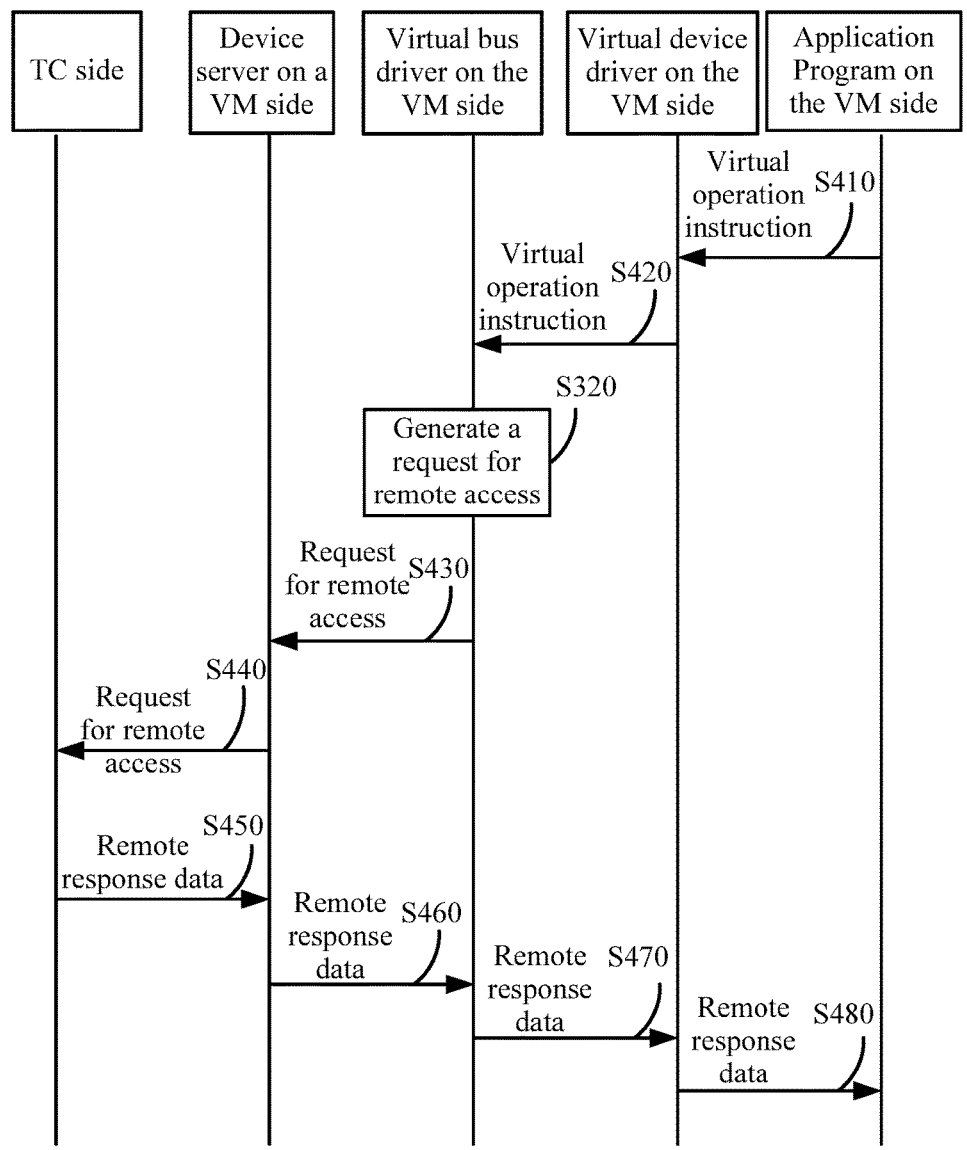
FIG. 4 is a flowchart of a device remote access method according to Embodiment 4 of the present disclosure.

FIG. 4 is a flowchart of a device remote access method according to Embodiment 4 of the present disclosure. Components in FIG. 4 that have same reference numerals as those in FIG. 3 have same functions. For brevity, a detailed description of these components is omitted.

As shown in FIG. 4, a major difference between the method shown in FIG. 4 and the method shown in FIG. 3 lies in that using a device server on a VM side, a virtual bus driver on the VM side sends a request for remote access to a TC side and/or receives remote response data on the TC side.

In a possible implementation manner, step S330 may further include the following steps.

Step S430: The virtual bus driver sends the request for remote access to the device server on the VM side.

Step S440: The device server forwards the received request for remote access to the TC side.

Furthermore, the device server on the VM side may receive data sent by the virtual bus driver, for example, the remote response data of the physical device on the TC side, and the device server may forward the request for remote access to the TC side using a network connected between the TC side and the VM side such that the TC side processes the request for remote access. To satisfy a requirement for network transmission, the device server may further convert the remote response data into data that supports network transmission protocols between the TC side and the VM side, and then send the data to the VM side.

In a possible implementation manner, after step S330, the method may further include the following steps.

Step S450: The device server on the VM side receives the remote response data sent by the TC side.

Step S460: The device server forwards the received remote response data to the virtual bus driver.

Step S470: The virtual bus driver forwards the received remote response data to a virtual device driver.

Step S480: The virtual device driver forwards the received remote response data to an application program on the VM side.

The device server may receive, using a network, data that is sent, based on a network transmission protocol between the TC side and the VM side, by the VM side, for example, the remote response data of the physical device of the TC side, and the device server forwards the remote response data to the virtual bus driver such that the virtual bus driver processes the remote response data. A device server on the VM side may further parse, based on the network transmission protocol between the TC side and the VM side, the received data to obtain the remote response data, and then send the remote response data to the virtual bus driver.

In a possible implementation manner, step S310 may further include the following steps:

Step S410: The virtual device driver receives a virtual operation instruction sent by an application program on the VM side.

Step S420: The virtual device driver forwards the received virtual operation instruction to the virtual bus driver.

If the virtual device driver on the VM side may receive the virtual operation instruction from the application program on the VM side to the VM side, that is, the application program needs to access a corresponding physical device on the TC side, the device driver forwards the virtual operation instruction to the virtual bus driver such that the virtual bus driver processes the virtual operation instruction.

In a possible implementation manner, the physical device is a smart card that is connected to the TC side using a USB.

In a possible implementation manner, the virtual bus driver is a virtual USB driver, the request for remote access is a remote USB request message, the virtual operation instruction is a local USB request message, and the remote response data is a local USB answer message.

For example, if the device server on the VM side receives an insertion notification sent by the TC side, a virtual device corresponding to the physical device on the TC side may be loaded according to the insertion notification. If the VM side has not installed the virtual device, the virtual device is initialized in order to load the virtual device. If the VM side has already installed the virtual device, a driver of the virtual device is directly loaded according to installation information of the virtual device in order to load the virtual device. After the VM side loads the virtual device, the VM side is configured with a virtual device driver corresponding to the virtual device. In addition, after the VM side loads the virtual device, the VM side may prompt, using a system message, that a new virtual device is loaded on the VM side such that the application program on the VM side can normally access the virtual device. The device server on the VM side may receive device information that is actively sent by the TC side, such as a device type and a device identifier of the physical device, or the device server on the VM side may actively query device information, and receive the device information that is returned, based on this, by the TC side. In addition, if the device server receives a removal notification of the physical device sent by the TC side, the device server may unload the corresponding virtual device according to the removal notification. In this way, synchronous loading and synchronous unloading of the virtual device on the VM side and the physical device on the TC side are implemented. The removal notification may carry the device information of the physical device such that the VM side determines which specific virtual device needs to be unloaded.

Embodiment 5

Figure 5:
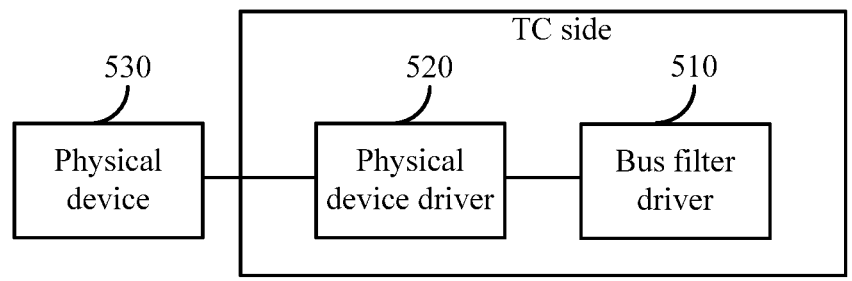
FIG. 5 is a block diagram of a TC side according to Embodiment 5 of the present disclosure.

FIG. 5 is a block diagram of a TC side according to Embodiment 5 of the present disclosure. As shown in FIG. 5, the TC side mainly includes a bus filter driver 510 and a physical device driver 520. The bus filter driver 510 is configured to receive a request for remote access by a VM side to a physical device 530 on the TC side, convert the request for remote access into a remote operation instruction that can be read by the physical device driver 520, and send the remote operation instruction to the physical device driver 520, where the remote operation instruction is used to instruct the physical device driver 520 to drive the physical device 530 to execute a read/write operation and return remote response data that carries an execution result of the read/write operation.

In a possible implementation manner, the physical device driver 520 is configured to receive a local operation instruction from an application program on the TC side to the physical device, and drive, according to the local operation instruction, the physical device to execute a read/write operation and return local response data that carries an execution result of the read/write operation.

For a specific mechanism used by the TC side to implement device remote access, and a beneficial effect, reference may be made to FIG. 1 and the description related to FIG. 1.

Embodiment 6

Figure 6:
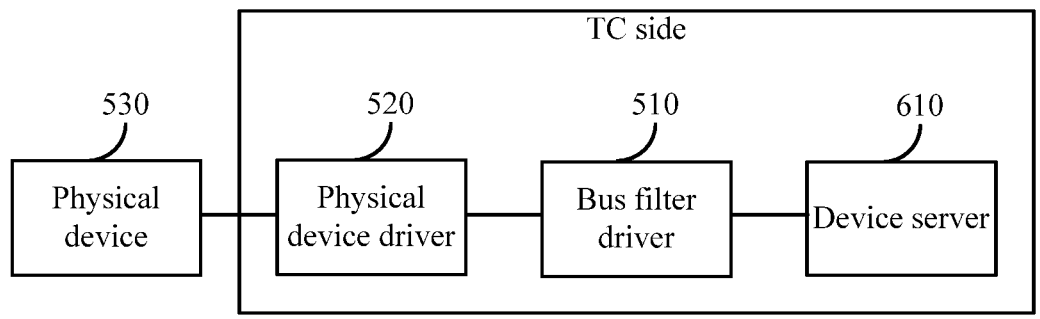
FIG. 6 is a block diagram of a TC side according to Embodiment 6 of the present disclosure.

FIG. 6 is a block diagram of a TC side according to Embodiment 6 of the present disclosure. Components in FIG. 6 that have same reference numerals as those in FIG. 5 have same functions. For brevity, a detailed description of these components is omitted.

As shown in FIG. 6, a major difference between the TC side shown in FIG. 6 and the TC side shown in FIG. 5 lies in that the TC side shown in FIG. 6 further includes a device server 610.

Further, the device server 610 is configured to receive the request for remote access of the VM side and forward the request for remote access to the bus filter driver 510. The bus filter driver 510 is further configured to receive the request for remote access of the device server 610.

In a possible implementation manner, the physical device driver 520 is further configured to receive the remote response data of the physical device 530 and forward the remote response data to the bus filter driver 510. The bus filter driver 510 is further configured to receive the remote response data of the physical device driver 520 and forward the remote response data to the device server 610. The device server 610 is further configured to receive the remote response data of the bus filter driver 510 and forward the remote response data to the VM side.

In a possible implementation manner, the physical device 530 is a smart card that is connected to the TC side using a USB.

In a possible implementation manner, the bus filter driver 510 is a USB filter driver, the request for remote access is a remote URB, the remote operation instruction and the local operation instruction are local URBs, and the remote response data and the local response data are local USB answer messages.

For a specific mechanism used by the TC side to implement device remote access, and a beneficial effect, reference may be made to FIG. 2 and the description related to FIG. 2.

Embodiment 7

Figure 7:
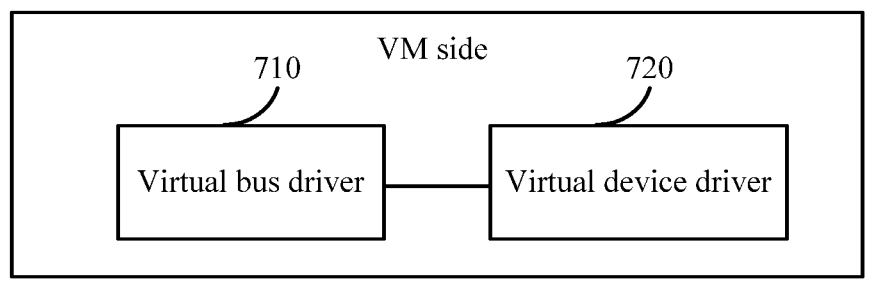
FIG. 7 is a block diagram of a VM side according to Embodiment 7 of the present disclosure.

FIG. 7 is a block diagram of a VM side according to Embodiment 7 of the present disclosure. As shown in FIG. 7, the VM side mainly includes a virtual bus driver 710 and a virtual device driver 720. The virtual bus driver 710 is configured to receive a virtual operation instruction from an application program on the VM side to the virtual device driver 720 on the VM side, convert the virtual operation instruction into a request for remote access that can be read by a bus filter driver on a TC side, and send the request for remote access to the TC side, where the request for remote access is used to instruct the bus filter driver to convert the request for remote access into a remote operation instruction that can be read by a physical device driver on the TC side, and the remote operation instruction is used to instruct the physical device driver to drive a physical device to execute a read/write operation and return remote response data that carries an execution result of the read/write operation.

For a specific mechanism used by the VM side to implement device remote access, and a beneficial effect, reference may be made to FIG. 3 and the description related to FIG. 3.

Embodiment 8

Figure 8:
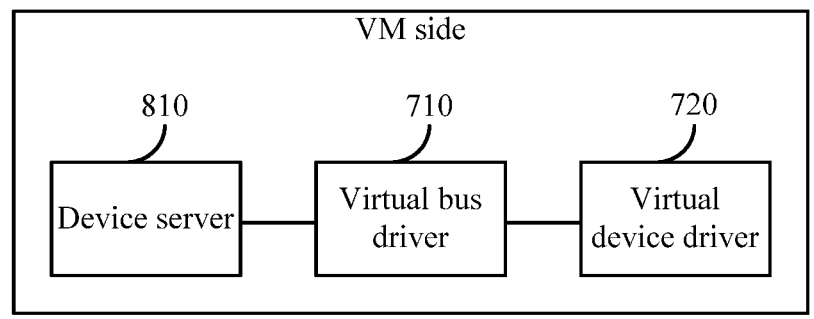
FIG. 8 is a block diagram of a VM side according to Embodiment 8 of the present disclosure.

FIG. 8 is a block diagram of a VM side according to Embodiment 8 of the present disclosure. Components in FIG. 8 that have same reference numerals as those in FIG. 7 have same functions. For brevity, a detailed description of these components is omitted.

As shown in FIG. 8, a major difference between the VM side shown in FIG. 8 and the VM side shown in FIG. 7 lies in that the VM side shown in FIG. 8 further includes a device server 810.

Further, the device server 810 is configured to receive the request for remote access of the virtual bus driver 710 and forward the request for remote access to the VM side.

In a possible implementation manner, the device server 810 is further configured to receive the remote response data of the VM side and forward the remote response data to the virtual bus driver 710. The virtual bus driver 710 is further configured to receive the remote response data of the device server 810 and forward the remote response data to the virtual device driver 720. The virtual device driver 720 is further configured to receive the remote response data of the virtual bus driver 710 and forward the remote response data to the application program.

In a possible implementation manner, the virtual device driver 720 is further configured to receive the virtual operation instruction of the application program and forward the virtual operation instruction to the virtual bus driver 710. The virtual bus driver 710 is further configured to receive the virtual operation instruction of the virtual device driver 720.

In a possible implementation manner, the physical device is a smart card that is connected to the TC side using a USB.

In a possible implementation manner, the virtual bus driver 710 is a virtual USB driver, the request for remote access is a remote URB, the virtual operation instruction is a local URB, and the remote response data is a local USB answer message.

For a specific mechanism used by the VM side to implement device remote access, and a beneficial effect, reference may be made to FIG. 4 and the description related to FIG. 4.

Embodiment 9

Figure 9:
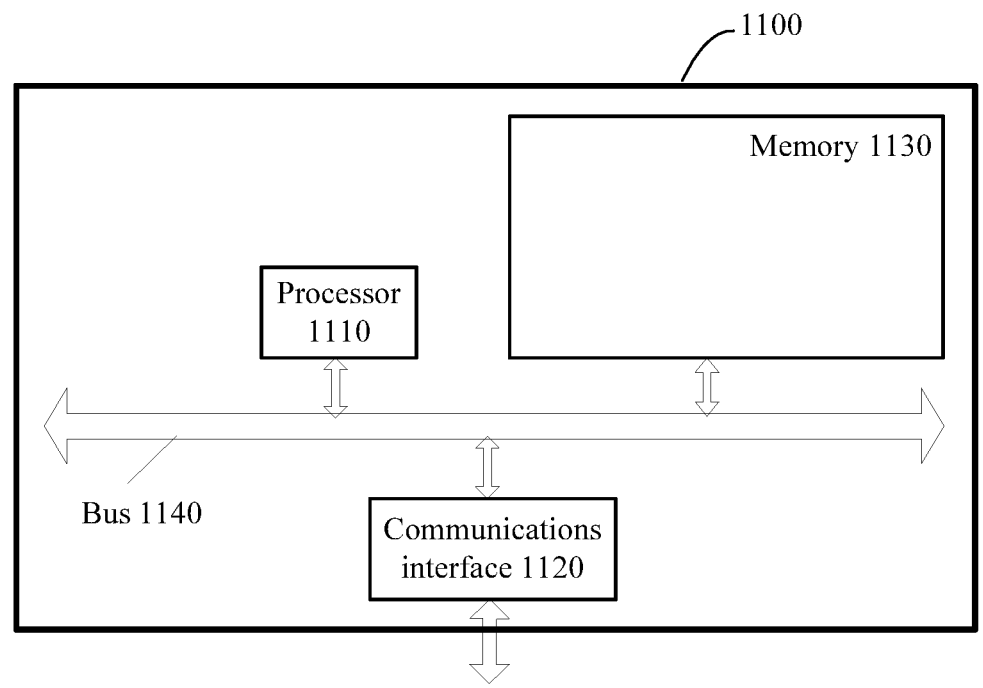
FIG. 9 is a block diagram of a TC side according to Embodiment 9 of the present disclosure.

FIG. 9 is a structural block diagram of a TC side according to Embodiment 9 of the present disclosure. The TC side 1100 may be a host server that has a computation capability, a personal computer (PC), a portable computer or terminal, or the like. Specific implementation of a computing node is not limited in this embodiment of the present disclosure.

The TC side 1100 includes a processor 1110, a communications interface 1120, a memory 1130, and a bus 1140. The processor 1110, the communications interface 1120, and the memory 1130 complete mutual communication using the bus 1140.

The communications interface 1120 is configured to communicate with a network device, where the network device includes a virtual machine management center, a shared memory, or the like.

The processor 1110 is configured to execute a program. The processor 1110 may be a central processing unit (CPU), or an application specific integrated circuit (ASIC), or one or more integrated circuits configured to implement this embodiment of the present disclosure.

The memory 1130 is configured to store a file. The memory 1130 may include a high-speed random-access memory (RAM) memory, or may include a non-volatile memory, for example, at least one disk memory. The memory 1130 may be a memory array. The memory 1130 may be divided into blocks, and the blocks may be combined into a virtual volume according to a specific rule.

In a possible implementation manner, the foregoing program may be program code that includes a computer operation instruction. The program may be further used to enable a bus filter driver of a TC side to receive a request for remote access by a VM side to a physical device on the TC side, enable the bus filter driver to convert the request for remote access into a remote operation instruction that can be read by a physical device driver, and enable the bus filter driver to send the remote operation instruction to the physical device driver, where the remote operation instruction is used to instruct the physical device driver to drive the physical device to execute a read/write operation and return remote response data that carries an execution result of the read/write operation.

In a possible implementation manner, the program may be further used to enable the physical device driver to receive a local operation instruction from an application program on the TC side to the physical device, and enable the physical device driver to drive, according to the local operation instruction, the physical device to execute a read/write operation and return local response data that carries an execution result of the read/write operation.

In a possible implementation manner, the program may be further used to, enable the bus filter driver to receive the request for remote access to the physical device that is sent by a device server on the TC side.

In a possible implementation manner, the program may be further used to enable the bus filter driver to receive, after the bus filter driver sends the remote operation instruction to the physical device driver, the remote response data that is returned by the physical device using the physical device driver, and enable the bus filter driver to send, using the device server, the remote response data to the VM side.

Embodiment 10

Figure 10:
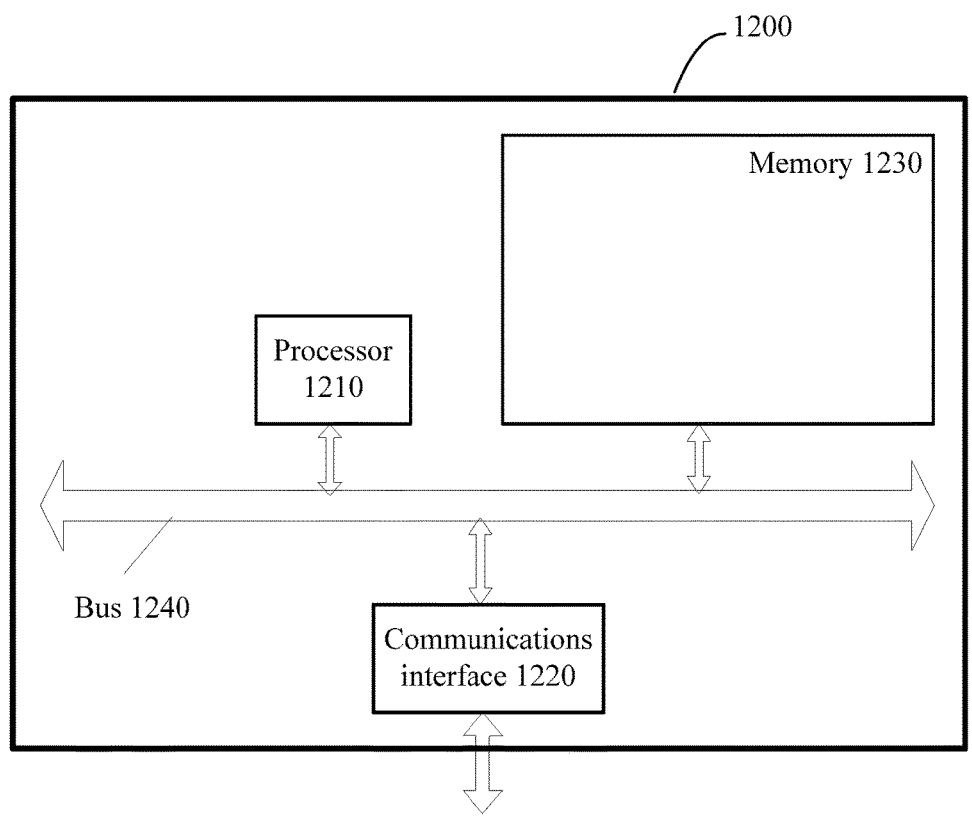
FIG. 10 is a block diagram of a VM side according to Embodiment 10 of the present disclosure.

FIG. 10 is a structural block diagram of a VM side according to Embodiment 10 of the present disclosure. The VM side 1200 may be a host server that has a computation capability, a PC, a portable computer or terminal, or the like. Specific implementation of a computing node is not limited in this embodiment of the present disclosure.

The VM side 1200 includes a processor 1210, a communications interface 1220, a memory (memory array) 1230, and a bus 1240. The processor 1210, the communications interface 1220, and the memory 1230 complete mutual communication using the bus 1240.

The communications interface 1220 is configured to communicate with a network device, where the network device includes a virtual machine management center, a shared memory, or the like.

The processor 1210 is configured to execute a program. The processor 1210 may be a central processing unit (CPU), or an application specific integrated circuit (ASIC), or one or more integrated circuits configured to implement this embodiment of the present disclosure.

The memory 1230 is configured to store a file. The memory 1230 may include a high-speed RAM memory, or may include a non-volatile memory, for example, at least one disk memory. The memory 1230 may be a memory array. The memory 1230 may be divided into blocks, and the blocks may be combined into a virtual volume according to a specific rule.

In a possible implementation manner, the foregoing program may be program code that includes a computer operation instruction. The program may be further used to enable a virtual bus driver on a VM side to receive a virtual operation instruction from an application program on the VM side to a virtual device driver on the VM side, enable the virtual bus driver to convert the virtual operation instruction into a request for remote access that can be read by a bus filter driver on a TC side, and enable the virtual bus driver to send the request for remote access to the TC side, where the request for remote access is used to instruct the bus filter driver to convert the request for remote access into a remote operation instruction that can be read by a physical device driver on the TC side, and the remote operation instruction is used to instruct the physical device driver to drive a physical device to execute a read/write operation and return remote response data that carries an execution result of the read/write operation.

In a possible implementation manner, the program may be further used to enable the virtual bus driver to receive the virtual operation instruction for a virtual device that is sent by the application program using the virtual device driver.

In a possible implementation manner, the program may be further used to enable the virtual bus driver to send, using a device server on the VM side, the request for remote access to the TC side.

In a possible implementation manner, the program may be further used to enable the virtual bus driver to receive, after the virtual bus driver sends the request for remote access to the TC side, the remote response data that is sent by the TC side using the device server on the VM side, and enable the virtual bus driver to send, using the virtual device driver, the remote response data to the application program.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that such implementation goes beyond the scope of the present disclosure.

If the functions are implemented in a form of computer software, and sold or used as an independent product, to some degree, all or some of the technical solutions of the present disclosure (for example, some that contribute to the prior art) are embodied in a form of a computer software product. The computer software product is generally stored in a computer readable storage medium and includes several instructions for instructing a computer device (which may be a PC, a server, a network device, or the like) to execute all or some of the steps of the methods described in the embodiments of the present disclosure. The foregoing storage medium includes any medium that can store program code, such as a USB flash drive, a removable hard disk, a read-only memory (ROM), a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A device remote access method, wherein the method is applied in a desktop cloud system and comprises:
    receiving, by a bus filter driver on a thin client (TC) side, a request for remote access by a virtual machine (VM) side to a physical device on the TC side;
    converting, by the bus filter driver, the request for remote access into a remote operation instruction that can be read by a physical device driver; and
    sending, by the bus filter driver, the remote operation instruction to the physical device driver,
    wherein the remote operation instruction is used to instruct the physical device driver to drive the physical device to execute a read/write operation and return remote response data that carries an execution result of the read/write operation.

2. The method according to claim 1, wherein after sending, by the bus filter driver, the remote operation instruction to the physical device driver, the method further comprises:
    receiving, by the bus filter driver, the remote response data that is returned by the physical device using the physical device driver; and
    sending, by the bus filter driver, the remote response data to the VM side.

3. The method according to claim 1 wherein the physical device is a smart card that is connected to the TC side using a universal serial bus (USB).

4. The method according to claim 3, wherein the bus filter driver is a USB filter driver, wherein the request for remote access is a remote USB request message, wherein the remote operation instruction and a local operation instruction are local USB request messages, and wherein the remote response data and local response data are local USB answer messages.

5. A device remote access method, wherein the method is applied in a desktop cloud system and comprises:
    receiving, by a virtual bus driver on a virtual machine (VM) side, a virtual operation instruction from an application program on the VM side to a virtual device driver on the VM side;
    converting, by the virtual bus driver, the virtual operation instruction into a request for remote access that can be read by a bus filter driver on a thin client (TC) side; and
    sending, by the virtual bus driver, the request for remote access to the TC side,
    wherein the request for remote access is used to instruct the bus filter driver to convert the request for remote access into a remote operation instruction that can be read by a physical device driver on the TC side, and
    wherein the remote operation instruction is used to instruct the physical device driver to drive a physical device to execute a read/write operation and return remote response data that carries an execution result of the read/write operation.

6. The method according to claim 5, wherein after sending, by the virtual bus driver, the request for remote access to the TC side, the method further comprises:
    receiving, by the virtual bus driver, the remote response data sent by the TC side; and sending, by the virtual bus driver, the remote response data to the application program using the virtual device driver.

7. The method according to claim 5, wherein the physical device is a smart card that is connected to the TC side using a universal serial bus (USB).

8. The method according to claim 7, wherein the virtual bus driver is a virtual USB driver, wherein the request for remote access is a remote USB request message, wherein the virtual operation instruction is a local USB request message, and wherein the remote response data is a local USB answer message.

9. A thin client (TC) side, comprising:
a bus filter driver; and
a physical device driver coupled to the bus filter driver, wherein the bus filter driver is configured to:
    receive a request for remote access by a virtual machine (VM) side to a physical device on the TC side;
    convert the request for remote access into a remote operation instruction that can be read by the physical device driver; and
    send the remote operation instruction to the physical device driver, and
wherein the remote operation instruction is used to instruct the physical device driver to drive the physical device to execute a read/write operation and return remote response data that carries an execution result of the read/write operation.

10. The TC side according to claim 9, wherein the physical device driver is further configured to:
    receive the remote response data of the physical device; and
    forward the remote response data to the bus filter driver, and
    wherein the bus filter driver is further configured to:
        receive the remote response data of the physical device driver and
        forward the remote response data to the VM side.

11. The TC side according to claim 9, wherein the physical device is a smart card that is connected to the TC side using a universal serial bus (USB).

12. The TC side according to claim 11, wherein the bus filter driver is a USB filter driver, wherein the request for remote access is a remote USB request message, wherein the remote operation instruction and a local operation instruction are local USB request messages, and wherein the remote response data and local response data are local USB answer messages.

13. A virtual machine (VM) side, comprising:
a virtual bus driver; and
a virtual device driver coupled to the virtual bus driver, wherein the virtual bus driver is configured to:
    receive a virtual operation instruction from an application program on the VM side to the virtual device driver on the VM side;
    convert the virtual operation instruction into a request for remote access that can be read by a bus filter driver on a thin client (TC) side; and
    send the request for remote access to the TC side, wherein the request for remote access is used to instruct the bus filter driver to convert the request for remote access into a remote operation instruction that can be read by a physical device driver on the TC side, and
wherein the remote operation instruction is used to instruct the physical device driver to drive a physical device to execute a read/write operation and return remote response data that carries an execution result of the read/write operation.

14. The VM side according to claim 13, wherein the virtual bus driver is further configured to:
    receive the remote response data of the VM side; and
    forward the remote response data to the virtual device driver, and
    wherein the virtual device driver is further configured to:
        receive the remote response data of the virtual bus driver; and
        forward the remote response data to the application program.

15. The VM side according to claim 13, wherein the physical device is a smart card that is connected to the TC side using a universal serial bus (USB).

16. The VM side according to claim 15, wherein the virtual bus driver is a virtual USB driver, wherein the request for remote access is a remote USB request message, wherein the virtual operation instruction is a local USB request message, and wherein the remote response data is a local USB answer message.

* * * * *